(12) United States Patent
Tan Bergström

(10) Patent No.: US 10,721,771 B2
(45) Date of Patent: Jul. 21, 2020

(54) TIMING INDICATION FOR CONTROLLING LISTEN-BEFORE-TALK PROCEDURE

(71) Applicant: Telefonaktiebolaget LM Ericsson (publ), Stockholm (SE)

(72) Inventor: Mattias Tan Bergström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 38 days.

(21) Appl. No.: 16/061,125

(22) PCT Filed: Dec. 28, 2015

(86) PCT No.: PCT/EP2015/081296
§ 371 (c)(1),
(2) Date: Jun. 11, 2018

(87) PCT Pub. No.: WO2017/114552
PCT Pub. Date: Jul. 6, 2017

(65) Prior Publication Data
US 2018/0359782 A1 Dec. 13, 2018

(51) Int. Cl.
*H04W 74/08* (2009.01)
*H04W 74/00* (2009.01)

(52) U.S. Cl.
CPC ..... *H04W 74/0816* (2013.01); *H04W 74/004* (2013.01); *H04W 74/0891* (2013.01)

(58) Field of Classification Search
CPC ........... H04W 74/0816; H04W 74/004; H04W 74/0891
See application file for complete search history.

(56) References Cited

U.S. PATENT DOCUMENTS

2015/0063327 A1 3/2015 Barriac et al.
2015/0172950 A1 6/2015 Chen et al.
(Continued)

FOREIGN PATENT DOCUMENTS

WO 2015169359 A1 5/2014

OTHER PUBLICATIONS

3rd Generation Partnership Project, "3rd Generation Partnership Project; Technical Specification Group Radio Access Network; Study on Licensed-Assisted Access to Unlicensed Spectrum; (Release 13)", Technical Report, 3GPP TR 36.889 V13.0.0, Jun. 1, 2015, pp. 1-285, 3GPP, France.
(Continued)

*Primary Examiner* — Ajay Cattungal
(74) *Attorney, Agent, or Firm* — Sage Patent Group

(57) ABSTRACT

An access node (100-A) of a wireless communication network receives an indication from a further access node (100-B) of the wireless communication network. The indication indicates a timing of a radio transmission (20A, 20B) performed by the further access node (100-B) on a set of radio resources. Based on the indication, the access node (100-A) determines a time which is not overlapped by the radio transmission (20A, 20B) performed by the further access node (100-B). Further, the access node (100-A) initiates a listen-before-talk procedure at the determined time. The listen-before-talk procedure comprises detecting whether there is an ongoing radio transmission on the set of radio resources and, in response to detecting that there is no ongoing radio transmission on the set of radio resources, performing a further radio (20A) transmission on the set of radio resources.

20 Claims, 7 Drawing Sheets

(56) References Cited

U.S. PATENT DOCUMENTS

| | | | |
|---|---|---|---|
| 2016/0073288 A1* | 3/2016 | Patil | H04W 74/08 |
| | | | 370/230 |
| 2016/0105897 A1* | 4/2016 | Liu | H04W 72/1226 |
| | | | 370/235 |
| 2017/0055181 A1* | 2/2017 | Tiirola | H04W 74/0808 |
| 2017/0142592 A1* | 5/2017 | Fischer | H04W 16/14 |
| 2018/0295628 A1* | 10/2018 | Lu | H04L 5/0044 |
| 2018/0332579 A1* | 11/2018 | Kang | H04W 72/0446 |
| 2018/0352573 A1* | 12/2018 | Yang | H04W 16/14 |

OTHER PUBLICATIONS

3rd Generation Partnership Project, "3rd Generation Partnership Project; Technical Specification Group Radio Access Network; Evolved Universal Terrestrial Radio Access Network (E-UTRAN); X2 application protocol (X2AP) (Release 13)", Technical Specification, 3GPP TS 36.423 V13.2.0, Dec. 1, 2015, pp. 1-230, 3GPP, France.

3rd Generation Partnership Project, "3rd Generation Partnership Project; Technical Specification Group Radio Access Network; Evolved Universal Terrestrial Radio Access Network (EUTRAN) and Wireless LAN (WLAN); Xw application protocol (XwAP) (Release 13)", Technical Specification, 3GPP TS 36.463 V1.0.0, Dec. 1, 2015, pp. 1-65 3GPP, France.

European Office Action dated Mar. 13, 2020 for European Patent Application No. 15820172.3, 6 pages.

* cited by examiner

TIMING INDICATION FOR CONTROLLING LISTEN-BEFORE-TALK PROCEDURE

TECHNICAL FIELD

The present invention relates to methods for radio transmission in a wireless communication network and to corresponding devices.

BACKGROUND

In current wireless communication networks, e.g., based on the LTE (Long Term Evolution) cellular radio access technology specified by 3GPP ($3^{rd}$ Generation Partnership Project), carriers from various frequency spectra may be utilized for performing radio transmissions. Typically, these carriers are selected from a frequency spectrum which is licensed to an operator of the wireless communication network.

To further improve the performance of LTE systems, extension of the LTE technology to unlicensed frequency spectra is being considered. This concept is also referred to as Licensed Assisted Access (LAA). For operation in an unlicensed frequency spectrum, certain compliance with certain requirements is typically considered necessary. One such requirement is that a transmitter needs to listen on a carrier utilized before it starts to transmit on this carrier. If the carrier is free, the transmitter can perform a radio transmission on the carrier. On the other hand, if the carrier is busy, e.g., because some other node is transmitting on the carrier, the transmitter needs to suppress the transmission and may retry gaining access to the carrier at a later time. This procedure is referred to as "listen before talk" (LBT). Corresponding issues are for example discussed in 3GPP TR 36.889 V13.0.0 (2015-06).

In the case of not gaining access to the carrier through the LBT procedure, the transmitter needs to delay a planned radio transmission until the carrier becomes free. This may involve multiple attempts of gaining access to the carrier and multiple LBT procedures. However, even if the carrier becomes free at some time, it may happen that the transmitter is not able to gain access to the carrier because some other node managed to occupy the carrier before the transmitter. This may result in undesirable accumulation of delays before the transmitter eventually succeeds in performing the LBT procedure at a time when the carrier is free. Accordingly, there is a need for techniques which allow for efficiently controlling LBT based radio transmission.

SUMMARY

According to an embodiment of the invention, a method of controlling radio transmission in a wireless communication network is provided. According to the method, an access node of the wireless communication network receives an indication from a further access node of the wireless communication network. The indication indicates a timing of a radio transmission performed by the further access node on a set of radio resources. Based on the indication, the access node determines a time which is not overlapped by the radio transmission performed by the further access node. Further, the access node initiates an LBT procedure at the determined time. The LBT procedure comprises detecting whether there is an ongoing radio transmission on the set of radio resources and, in response to detecting that there is no ongoing radio transmission on the set of radio resources, performing a further radio transmission on the set of radio resources.

According to a further embodiment of the invention, a method of controlling radio transmission in a wireless communication network is provided. According to the method, an access node of the wireless communication network sends an indication to a further access node of the wireless communication network. The indication indicates a timing of a radio transmission performed by the access node on a set of radio resources. Further, the access node initiates an LBT procedure. The LBT procedure comprises detecting whether there is an ongoing radio transmission on the set of radio resources and, in response to detecting that there is no ongoing radio transmission on the set of radio resources, performing the radio transmission on the set of radio resources.

According to a further embodiment of the invention, an access node is provided. The access node is configured to receive an indication from a further access node of the wireless communication network. The indication indicates a timing of a radio transmission performed by the further access node on a set of radio resources. Further, the access node is configured to determine, based on the indication, a time which is not overlapped by the radio transmission performed by the further access node. Further, the access node is configured to initiate an LBT procedure at the determined time. The LBT procedure comprises detecting whether there is an ongoing radio transmission on the set of radio resources and, in response to detecting that there is no ongoing radio transmission on the set of radio resources, performing a further radio transmission on the set of radio resources.

According to a further embodiment of the invention, an access node is provided. The access node is configured to send an indication to a further access node of the wireless communication network. The indication indicates a timing of a radio transmission performed by the access node on a set of radio resources. Further, the access node is configured to initiate an LBT procedure. The LBT procedure comprises detecting whether there is an ongoing radio transmission on the set of radio resources and, in response to detecting that there is no ongoing radio transmission on the set of radio resources, performing a further radio transmission on the set of radio resources.

According to a further embodiment of the invention, a computer program or computer program product is provided, e.g., in the form of a non-transitory storage medium, which comprises program code to be executed by at least one processor of an access node of a wireless communication network. Execution of the program code causes the access node to receive an indication from a further access node of the wireless communication network. The indication indicates a timing of a radio transmission performed by the further access node on a set of radio resources. Further, execution of the program code causes the access node to determine, based on the indication, a time which is not overlapped by the radio transmission performed by the further access node. Further, execution of the program code causes the access node to initiate an LBT procedure at the determined time. The LBT procedure comprises detecting whether there is an ongoing radio transmission on the set of radio resources and, in response to detecting that there is no ongoing radio transmission on the set of radio resources, performing a further radio transmission on the set of radio resources.

According to a further embodiment of the invention, a computer program or computer program product is provided, e.g., in the form of a non-transitory storage medium, which comprises program code to be executed by at least one processor of an access node of a wireless communication network. Execution of the program code causes the access node to send an indication to a further access node of the wireless communication network. The indication indicates a timing of a radio transmission performed by the access node on a set of radio resources. Further, execution of the program code causes the access node to initiate an LBT procedure. The LBT procedure comprises detecting whether there is an ongoing radio transmission on the set of radio resources and, in response to detecting that there is no ongoing radio transmission on the set of radio resources, performing a further radio transmission on the set of radio resources.

Details of such embodiments and further embodiments will be apparent from the following detailed description of embodiments.

DETAILED DESCRIPTION OF EMBODIMENTS

Figure 1:
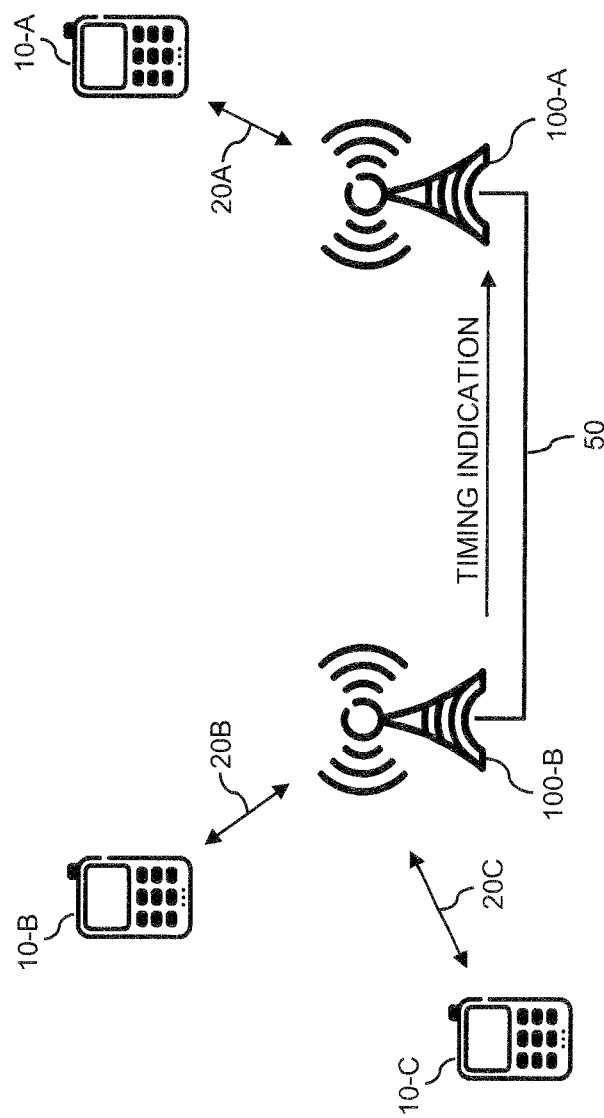
FIG. 1 schematically illustrates an exemplary scenario in a wireless communication network in which an LBT procedure is controlled according to an embodiment of the invention.

In the following, concepts in accordance with exemplary embodiments of the invention will be explained in more detail and with reference to the accompanying drawings. The illustrated embodiments relate to controlling radio transmission in a wireless communication network. In the illustrated examples, it is assumed that the wireless communication network is based on the LTE technology. However, it is to be understood that other wireless communication technologies could be utilized as well. For example, as mentioned below, the wireless communication network could utilized both the LTE cellular radio access technology and a Wireless Local Area Network (WLAN) technology.

In the illustrated concepts, a timing indication is used for controlling an LBT procedure. Specifically, an access node which performs or has scheduled a radio transmission on certain radio resources, e.g., radio resources from an unlicensed frequency spectrum, sends an indication of a timing of this radio transmission to one or more other access nodes which might also use these radio resources for performing a further radio transmission. Here, the access node performing the radio transmission may correspond to the access node sending or receiving the radio transmission. Further, this may involve that the access node schedules a radio device to perform the radio transmission on the radio resources. The radio resources may correspond to one or more carriers defined in the frequency domain. However, other ways of defining the radio resources may be used in addition or as an alternative, e.g., defining the radio resources by time division multiplexing, code division multiplexing and/or spatial multiplexing.

On the basis of the timing indication, the other access node may then initiate an LBT procedure at a time which is not overlapped by the radio transmission, i.e., after the radio transmission ended for before the radio transmission started. Typically, such LBT procedure may be initiated if the further radio transmission is needed, e.g., for transferring data. The other access node may perform the LBT procedure itself, e.g., if the further radio transmission is a downlink transmission from the other access node. The other access node may also schedule a radio device connected to the other access node to perform the LBT procedure at the determined time, e.g., if the further radio transmission is an uplink transmission from a radio device to the other access node. As a result, the chances of the LBT procedure allowing the other access node to gain access to the radio resources may be improved and delays of a radio transmission performed by the other access node based on the LBT procedure can be avoided. Specifically, the timing indication allows for avoiding that the LBT procedure is initiated while the access node is still transmitting and the radio resources are thus occupied, which means that it would not be possible to gain access to the radio resources through the LBT procedure anyway. Avoiding such unsuccessful LBT procedures in turn allows for improving resource efficiency, e.g., with respect to power consumption.

As used herein, a radio transmission performed by an access node may correspond to a downlink transmission from the access node to a radio device and/or to an uplink transmission from a radio device to the access node. Both access nodes could be base stations of a cellular radio access technology, e.g., of the LTE cellular radio access technology. In the case of base stations of the LTE cellular radio access technology, typically referred to as eNB, the timing indication may be transmitted via the X2 interface defined between eNBs of the LTE cellular radio access technology, e.g., as specified in 3GPP TS 36.423 V13.2.0 (2015-12). In other scenarios, one of the access nodes could be a base station of a cellular radio access technology, e.g., of the LTE cellular radio access technology, while the other access node is an access point of a WLAN technology. If one access node corresponds to an eNB and the other access node corresponds to a WLAN and access point, the timing indication may be transmitted via the Xw interface as for example specified in 3GPP TS 36.463 V1.0.0 (2015-12). Nonetheless, it is to be understood that other scenarios are possible as well, e.g., a scenario in which both access nodes correspond to access points of a WLAN technology.

FIG. 1 illustrates an exemplary scenario in which the concepts as outlined above may be applied. Specifically, FIG. 1 shows a first access node 100-A and a second access node 100-B of the wireless communication network. As mentioned above, the first access node 100-A and the second access node 100-B may correspond to eNB of the LTE cellular radio access technology or to base stations of another cellular radio access technology. Further, at least one of the first access node 100-B and the second access node 100-B may correspond to an access point of a WLAN technology. As illustrated, the first access node 100-A and the second access node 100-B are connected by an interface 50. Depending on the implementation of the access nodes 100-A, 100-B, the interface 50 may for example correspond to the X2 interface defined between eNBs of the LTE cellular radio access technology or to the Xw interface defined between an eNB of the LTE cellular radio access technology and a WLAN access point. However, it is to be understood that other interface types between the access nodes 100-A, 100-B could be utilized as well. Further, it should be noted that in some scenarios the Xw interface may terminate in some other WLAN node, such as a WLAN access controller, which may then forward the timing indication to or from a WLAN access point implemented by the access node 100-A, 100-B.

By way of example, FIG. 1 also illustrates radio devices 10-A, 10-B, and 10-C which are connected via the access nodes 100-A, 100-B to the wireless communication network. In the illustrated example, the radio device 10-A is connected to the access node 100-A, and the radio devices 10-B and 10-C are connected to the access node 100-B. The radio devices 10-A, 10-B, 10-C may for example correspond to mobile phones, portable computer devices, stationary computer devices, or any other kind of wirelessly connected device. In the following, the radio devices 10-A, 10-B, and 10-C will also be referred to as UE ("user equipment").

As further illustrated, the access node 100-A performs a radio transmission 20A to and/or from the UE 10-A, the access node 100-B performs a radio transmission 20B to and/or from the UE 10-B, and the access node 100-B performs a radio transmission 20C to and/or from the UE 10-B. In the illustrated scenario, it is assumed that each of these radio transmissions 20A, 20B, 20C is performed on the same or at least overlapping radio resources and based on an LBT procedure. For example, such LBT procedure may be required due to the radio resources used for the radio transmissions 20A, 20B, 20C being selected from an unlicensed frequency spectrum. For example, each of the radio transmissions 20A, 20B, 20C may be performed on one or more carriers from an unlicensed frequency spectrum. Such unlicensed frequency spectrum may include one or more unlicensed frequency bands, and such multiple unlicensed frequency bands may be adjacent or separated from each other in the frequency domain.

In the following, an example of controlling the LBT procedure will be explained in more detail. In this example, it is assumed that the LBT procedure relates to the radio transmission 20A performed by the first access node 100-A and the UE 10-A. If the radio transmission 20A corresponds to a downlink transmission from the first access node 100-A to the UE 10-A, the LBT procedure is performed by the first access node 100-A itself. If the radio transmission 20A corresponds to an uplink transmission from the UE 10-A to the first access node 100-A, the LBT procedure is performed by the UE 10-A. In some scenarios, the radio transmission 20A may also comprise both a downlink transmission and an uplink transmission, which means that each of the first access node 100-A and the UE 10-A would perform the LBT procedure for the respective part of the transmission.

The LBT procedure involves first detecting whether there is an ongoing radio transmission on the radio resources, i.e., detecting whether the radio resources are occupied. This detection may for example involve detecting a received power on the radio resources and comparing the detected received power to a detection threshold, sometimes also referred to as Clear Channel Assessment (CCA) threshold. If in the detected received power is above the detection threshold, an ongoing radio transmission is considered to be detected. Otherwise, the radio resources are considered to be free. Only when no ongoing radio transmission is detected, i.e., the radio resources are not occupied, the radio transmission 20A is performed. If an ongoing radio transmission is detected, a delay may be determined, e.g., a random delay, and the LBT procedure will be repeated after this delay.

The LBT procedure performed with respect to the radio transmission 20A is controlled depending on a timing indication transmitted via the interface from the second access node 100-B to the first access node 100-A. As mentioned above, the timing indication indicates a timing of a radio transmission performed by the second access node 100-B. In the illustrated example, the timing indication may indicate the timing of the radio transmission 20B performed by the second access node 100-B and the UE 10-B or the timing of the radio transmission 20C performed by the second access node 100-B and the UE 10-C. The timing may be for example be indicated in terms of a start time and/or an end time of the radio transmission. The timing indication is used by the first access node 100-A to control the time when the LBT procedure with respect to the radio transmission 20A is performed. If the LBT procedure is performed by the UE 10-A, this control may involve scheduling the radio transmission 20A in a corresponding time slot. Specifically, the first access node 100-A determines from the timing indication a time which is not overlapped by the radio transmission 20B, 20C performed by the second access node 100-B, i.e., a time either before start of the radio transmission 20B, 20C for a time after and of the radio transmission 20B, 20C, and initiates the LBT procedure with respect to the radio transmission 20A at this time. In this way, it can at least be avoided that the radio transmission 20B, 20C performed by the second access node 100-B courses failure of the LBT procedure because the radio resources are found to be occupied. Further, by suitably determining the time when the LBT procedure is initiated, additional benefits can be achieved. Examples of corresponding scenarios will now be explained with respect to FIGS. 2 and 3.

Figure 2:
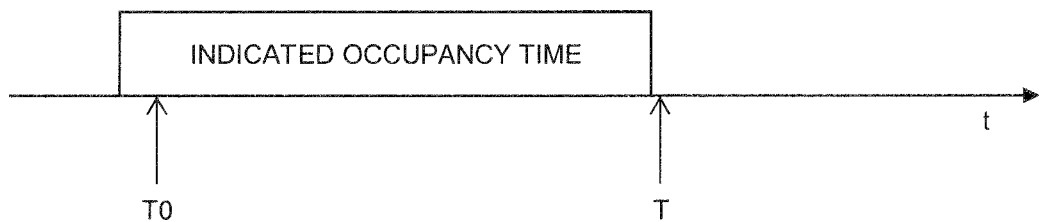
FIG. 2 shows an example of utilizing a timing indication according to an embodiment of the invention.

In the scenario of FIG. 2, the timing indication is transmitted at time TO, which in the illustrated example is assumed to be during the radio transmission 20B, 20C performed by the second access node 100-B. However, it is to be understood that the timing indication could also be transmitted before the radio transmission 20B, 20C performed by the second access node 100-B. The timing indication is in this case assumed to at least indicate an end time of the radio transmission 20B, 20C performed by the second access node 100-B. Based on this information, the first access node 100-A determines a time T immediately after the end time of the radio transmission 20B, 20C and initiates the LBT procedure with respect to the radio transmission 20A at this time T. In this way, the chances of grabbing the radio resources for the radio transmission 20A while the radio resources are unoccupied can be increased because there is less risk that some other transmitter will manage to grab the radio resources earlier. It should be noted that the first access node 100-A may also determine the time T to correspond to a later time after the end time of the radio transmission 20B, 20C, e.g., to correspond to the end time of the radio transmission 20B, 20C plus some offset.

Figure 3:
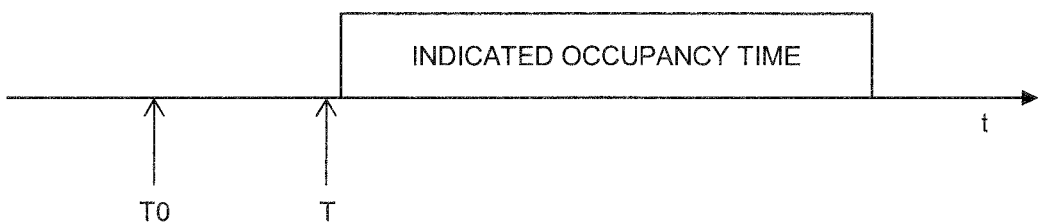
FIG. 3 shows a further example utilizing a timing indication according to an embodiment of the invention.

In the scenario of FIG. 3, the timing indication is transmitted at time TO, before the radio transmission 20B, 20C performed by the second access node 100-B. The timing indication is in this case assumed to at least indicate a start time of the radio transmission 20B, 20C performed by the second access node 100-B. Based on this information, the first access node 100-A determines a time T before the start time of the radio transmission 20B, 20C and initiates the LBT procedure with respect to the radio transmission 20A at this time T. In this way, the transmitter of the radio transmission 20A, i.e., the first access node 100-A or the UE 10-A gets a chance of grabbing the radio resources from the second access node 100-B, UE 10-B, or UE 10-C. This may for example be beneficial if the radio transmission 20A has a higher priority than the radio transmission 20-B, 20-C performed by the second access node 100-B. This option may for example be utilized if downlink traffic is considered more critical than uplink traffic and thus is given a higher priority. Further, the QoS (Quality of Service) characteristics of the traffic conveyed by the radio transmissions 20A, 20B, 20C may be considered. To support corresponding decisions by the first access node 100-A the timing indication may also include information concerning the priority or type of traffic which is being conveyed by the radio transmission 20B, 20C. For example if the timing indication indicates that the radio transmission 20B, 20C performed by the second access node 100-B conveys voice traffic and the radio transmission 20A performed by the first access node 100-A conveys best effort traffic, the first access node 100-A may refrain from selecting the early time for initiating the LBT procedure as illustrated in FIG. 3, but may rather initiate the LBT procedure after the end time of the radio transmission 20B, 20C performed by the second access node 100-B, as illustrated by FIG. 2.

Accordingly, in addition to indicating the timing of the radio transmission 20-B, 20-C performed by the second access node 100-B, e.g., in terms of a start time and an end time, in terms of a start time and a duration, or in terms of a remaining duration from the current time, the timing indication may also indicate other information, such as priority or type of conveyed traffic.

As another example, the first access node 100-A and the second access node 100-B be configured to perform their respective radio transmissions 20A, 20B, 20C on multiple different carriers, and the timing indication could indicate to which carrier it pertains or indicate the timing per carrier. The first access node 100-A could thus learn from the timing indication when a certain one of the carriers may become unoccupied or may not be occupied yet. In some scenarios, the second access node 100-B may send the timing indication only for those carriers the first access node 100-A is using. Corresponding information could be provided beforehand to the second access node 100-B, e.g., in a message sent by the first access node 100-A to request the timing indication from the second access node 100-B. Such request could also be transmitted in terms of a subscription indicating that the first access node 100-A should be provided with the timing indication for radio transmissions of the second access node, without requiring an individual request for each radio transmission.

As a further example, the timing indication may indicate whether the radio transmission 20-B, 20-C performed by the second access node 100-B is a downlink transmission or an uplink transmission. This information may be beneficial to consider the possibility that the UE 10-B, 10-C as a transmitter of the radio transmission 20B, 20C might be hidden from the perspective of the first access node 100-A. For example, the UE 10-C could be located too far from the first access node 100-A so that the radio transmission 20C in the uplink direction from the UE 10-C to the second access node 100-B would not be detectable by the first access node 100-A or the UE 10-A, i.e., the received power of the radio transmission 20-C as detected by the first access node 100-A or UE 10-A would be below the detection threshold. Accordingly, if the timing indication indicates an uplink transmission, the first access node 100-A may infer that the radio transmission would not be detectable anyway and also initiate the LBT procedure for the radio transmission 20A during the radio transmission 20C. On the other hand, if the second access node 100-B is the transmitter of the radio transmission 20C, the radio transmission 20C may be detectable by the first access node 100-A or UE 10-A, e.g., due to a higher transmission power, different relative location, or otherwise different transmission characteristics. These considerations may differ from UE to UE. For example, due to the UE 10-B being located closer to the first access node 100-A, the radio transmission 20B could also be detectable by the first access node 100-A or the UE 10-A in the uplink direction from the UE 10-B to the second access node 100-B. Information whether the certain UE 10-B, 10-C is detectable when performing a radio transmission in the uplink direction may for example be derived from measurements performed by the access nodes 100-A, 100-B and/or the UEs 10-A, 10-B, 10-C, e.g., measurements as performed for supporting cell selection or mobility procedures. In such measurements, radio signals may be identified with respect to their source and evaluated accordingly. For example, the first access node 100-A may identify a certain radio signal as being transmitted by the second access node 100-B by considering a Physical Cell Identity (PCI) associated with the radio signal. In view of the possible differences between the UEs 10-B, 10-C it may also be beneficial if the timing indication indicates to which UE 10-B, 10-C it pertains.

Accordingly, in some cases the timing indication may include information which enables the first access node 100-A to determine whether the concerned radio transmission 20B, 20C is detectable by the transmitter of the radio transmission 20A, i.e., the first access node 100-A or the UE 10-A. As used herein and already indicated above, the radio transmission being detectable by a certain node may be defined as follows: If the received power of the radio transmission as detected by this node is above the detection threshold used in the LBT procedure, the radio transmission would be detectable by this node. If the received power of the radio transmission as detected by this node is below the detection threshold used in the LBT procedure, the radio transmission would not be detectable by this node.

Information whether the concerned radio transmission would be detectable may also be considered for purposes of managing sending of the timing indication. For example, if the second access node 100-B determines that the radio transmission 20C would not be detectable by the first access node 100-A or the UE 10-A, the second access node 100-B may refrain from sending the timing indication for the radio transmission 20C to the first access node 100-A. Similarly, if the second access node 100-B determines that the radio transmission 20B would be detectable by the first access node 100-A or the UE 10-A, the second access node 100-B may send the timing indication for the radio transmission 20B to the first access node 100-A. In other words, the second access node 100-B may send the timing indication for the radio transmission 20B, 20C to the first access node 100-A only in response to determining that the radio transmission 20B, 20C would be detectable by the first access node 100-A or the UE 10-A. It is to be understood that such selective sending of the timing indication may also distinguish between individual UEs and/or downlink and uplink transmissions. For example, the second access node 100-B could send the timing indication for the radio transmission 20B performed by the second access node 100-B and the UE 10-B, but not for the radio transmission 20C performed by the second access node 100-B and the UE 10-C. Similarly, the second access node 100-B could send the timing indication for the radio transmission 20B, 20C performed in the downlink direction, but not for the radio transmission 20B, 20C performed in the uplink direction.

The sending of the timing indication may also be managed by controlling requesting of the timing indication depending on information whether certain radio transmissions would be detectable. For example, the first access node 100-A may determine that radio transmissions performed by the second access node 100-B or by the UEs 10-B, 10-C connected to the second access node 100-B would not be detectable by the first access node 100-A or the UE 10-A connected to the first access node 100-A. As a consequence, the first access node 100-A may refrain from requesting the timing indication with respect to such radio transmissions from the second access node 100-B. Again, it is to be understood that such selective requesting of the timing indication may also distinguish between individual UEs and/or downlink and uplink transmissions. For example, the first access node 100-A could request the timing indication for the radio transmission 20B performed by the second access node 100-B and the UE 10-B, but not for the radio transmission 20C performed by the second access node 100-B and the UE 10-C. Similarly, the first access node 100-A could request the timing indication for the radio transmission 20B, 20C performed in the downlink direction, but not for the radio transmission 20B, 20C performed in the uplink direction.

The sending of the timing indication may also be managed depending on a delay associated with the transmission of the timing indication via the interface 50. In this way, it can be taken into account that the timing indication might only be useful for the first access node 100-A if the delay is below a threshold. Otherwise, no significant advantages of sending the timing indication at the time determined depending on the timing indication might be achieved as compared to performing the LBT procedure at an arbitrary time. Rather, in such cases considering the timing indication might even further delay a successful LBT procedure. Such threshold delay above which sending of the LBT information would provide no significant advantages may correspond to about a typical duration of the radio transmissions 20A, 20B, 20C in the wireless communication network.

In some scenarios, the first access node 100-A could also estimate from the timing indication when it would get an opportunity to perform the radio transmission 20A. For example if timing indication indicates that the earliest opportunity of performing the LBT procedure is too late performing the radio transmission, the first access node 100-A may rather decide to use alternative radio resources for performing the radio transmission 20A, e.g., radio resources from a licensed frequency spectrum which do not require performing an LBT procedure.

Figure 4:
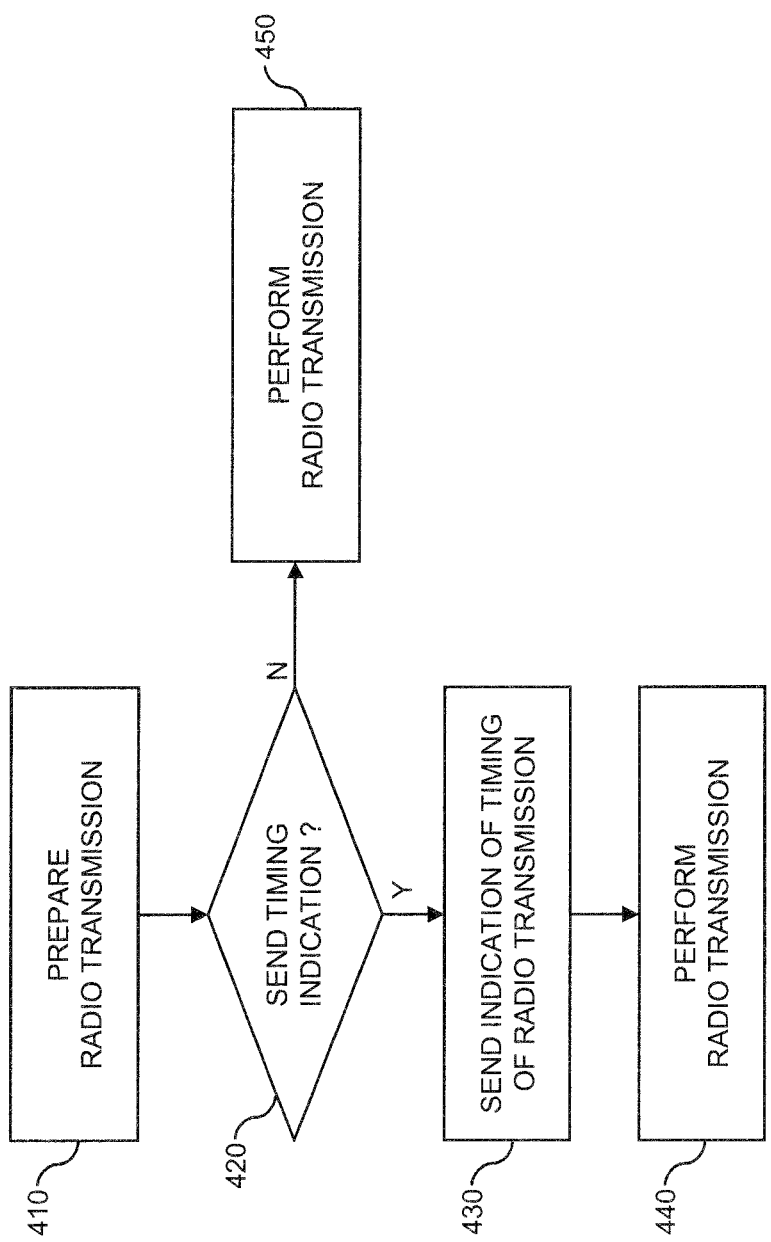
FIG. 4 shows a flowchart for schematically illustrating a method according to an embodiment of the invention.

FIG. 4 shows a flowchart for illustrating a method of controlling radio transmission in a wireless communication network. The method may be utilized for implementing the illustrated concepts in an access node, e.g., a base station of a cellular radio access technology, such as an eNB of the LTE cellular radio access technology, or an access point of a WLAN technology. The method may for example be performed by the above-mentioned access node 100-B. If a processor-based implementation of the access node is used, the steps of the method may be performed by one or more processors of the access node. In such a case the access node may further comprise a memory in which program code or other information for implementing the below described functionalities is stored.

At optional step 410, the access node may prepare a radio transmission. The radio transmission may include a downlink radio transmission from the access node to one or more radio devices and/or an uplink radio transmission from one or more radio devices to the access node. An example of such radio transmission is the radio transmission 20B or 20C performed by the access node 100-B. Examples of such radio devices are the UEs 10-B, 10-C. The preparation of step 410 may for example involve scheduling the radio transmission, e.g., by selecting a set of radio resources to be used for the radio transmission. Further, this may also involve indicating the selected radio resources to a radio device to or from which the radio transmission is to be performed, e.g., to the UE 10-B or 10-C. The set of radio resources may be from an unlicensed frequency spectrum, e.g., a frequency spectrum shared with other operators and/or other radio technologies. The unlicensed frequency spectrum may include one or more unlicensed frequency bands, and such multiple unlicensed frequency bands may be adjacent or separated from each other in the frequency domain.

At optional step 420, the access node may determine whether it should send an indication of a timing of a radio transmission performed by the access node on a set of radio resources, e.g., of the radio transmission prepared at step 410, to a further access node of the wireless communication network. An example of such further access node is the above-mentioned access node 100-A.

The decision of step 420 may involve that the access node determines whether the radio transmission performed by the access node is detectable by the further access node or at least one radio device connected to the further access node. Specifically, in response to determining that the radio transmission performed by the access node is detectable by the further access node or at least one radio device connected to the further access node, the access node may decide to send the indication to the further access node.

Alternatively or in addition, the decision of step 420 may involve that the access node determines a delay associated with transmission of the indication from the further access node to the further access node. Specifically, in response to the delay being below a threshold, the access node may decide to send the indication to the further access node.

Alternatively or in addition, the decision of step 420 may involve that the access node receives a request from the further access node and takes the decision to send the indication based on the request. The request may relate to an individual radio transmission performed by the access node or to a set of individual radio transmissions. Further, the request may be provided in terms of a subscription.

In response to deciding to send the indication, the access node proceeds to step 430, as indicated by branch "Y". In response to determining that the indication should not be sent, the access node proceeds to step 450, as indicated by branch "N".

At step 430, the access node sends an indication to a further access node of the wireless communication network, e.g., the indication mentioned in connection with steps 410 or 420. An example of such further access node is the above-mentioned access node 100-A. The indication indicates a timing of a radio transmission performed by the access node on a set of radio resources, e.g., of the radio transmission prepared at step 410. An example of such indication is the above-mentioned timing indication transmitted by the access node 100-B. As mentioned in connection with step 410, the radio transmission may include a downlink transmission from the access node to one or more radio devices and/or an uplink radio transmission from one or more radio devices to the access node. An example of such radio transmission is the radio transmission 20B or 20C performed by the access node 100-B, and examples of such radio devices are the UEs 10-B, 10-C. The set of radio resources may be from an unlicensed frequency spectrum, e.g., a frequency spectrum shared with other operators and/or other radio technologies. The access node may send the indication before start of the radio transmission or during the radio transmission. Examples of how transmission of the indication may be timed are described above in connection with FIGS. 2 and 3.

The indication may indicate whether the radio transmission performed by the access node comprises a downlink radio transmission from the access node to at least one radio device, e.g., the UE 10-B, 10-C, and/or an uplink radio transmission from at least one radio device, e.g., the UE 10-B, 10-C, to the access node. The indication may also identify such radio device. In some scenarios, the radio transmission performed by the access node may utilize one or more carriers. The indication may then also identify the carrier(s). In some scenarios, the indication may also otherwise identify the set of radio resources or radio resources from the set, e.g., in terms of one or more resource blocks defined in the time-frequency domain. Further, the indication may indicate a traffic type associated with the radio transmission performed by the access node or a priority of traffic associated with the radio transmission performed by the access node.

As mentioned above, each of the access node and the further access node may correspond to a base station of a cellular radio access technology, e.g., to an eNB of the LTE cellular radio access technology. If the access node and the further access node each correspond to an eNB, the indication may be transmitted via an X2 interface of the LTE radio access technology.

In other scenarios, one of the access node and the further access node corresponds to a base station of a cellular radio access technology, e.g., to an eNB of the LTE cellular radio access technology, and the other of the access node and the further access node corresponds to an access point of a WLAN technology. If one of the access node and the further access node corresponds to an eNB and the other of the access node and the further access node corresponds to an access point of a WLAN technology, the indication may transmitted via an Xw interface of the LTE radio access technology.

At step 440, the access node performs the radio transmission. In the method of FIG. 4, this is assumed to involve initiating an LBT procedure. The LBT procedure involves detecting whether there is an ongoing radio transmission on the set of radio resources and, in response to detecting that there is no ongoing radio transmission on the set of radio resources, performing the radio transmission on the set of radio resources. However, it is to be noted that in alternative scenarios the radio transmission could also be performed without performing the LBT procedure.

At step 450, the access node performs the radio transmission without sending the indication. In the method of FIG. 4, this is assumed to involve initiating an LBT procedure. The LBT procedure involves detecting whether there is an ongoing radio transmission on the set of radio resources and, in response to detecting that there is no ongoing radio transmission on the set of radio resources, performing the radio transmission on the set of radio resources.

Figure 5:
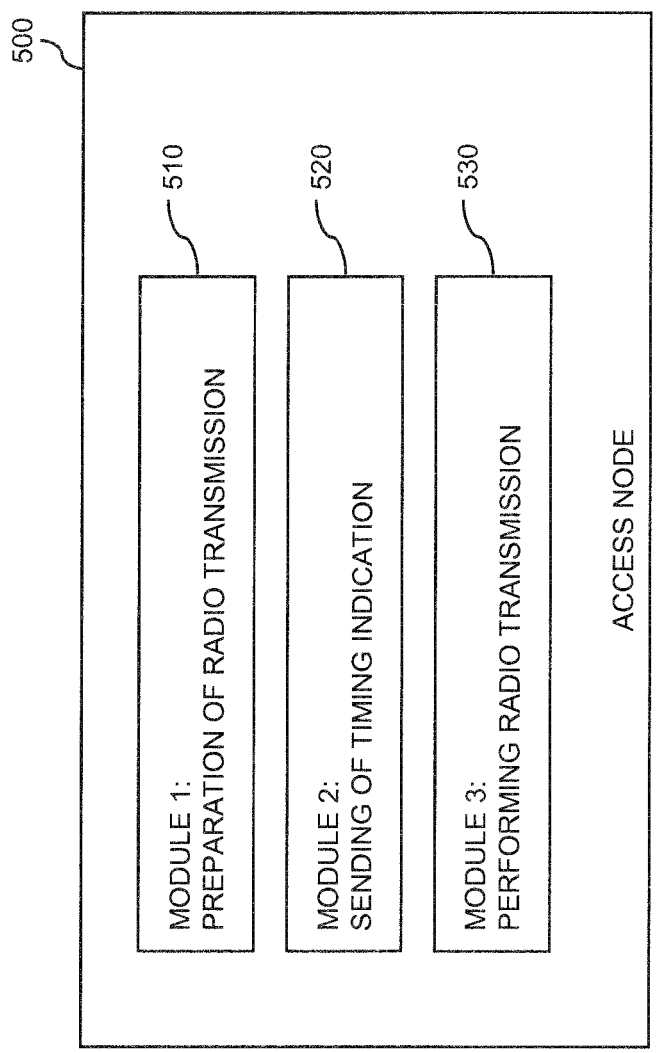
FIG. 5 shows a block diagram for illustrating functionalities of an access node according to an embodiment of the invention.

FIG. 5 shows a block diagram for illustrating functionalities of an access node 500 which operates according to the method of FIG. 4. As illustrated, the access node 500 may be provided with an optional module 510 configured to prepare the radio transmission, such as explained in connection with step 410. Further, the access node 500 may be provided with a module 520 configured to send the indication of the timing of the radio transmission to the further access node, such as explained in connection with steps 420 and 430. Further, the access node 500 may be provided with a module 530 configured to perform the radio transmission and control an associated LBT procedure, such as explained in connection with steps 440 and 450.

It should be understood that the access node 500 may also include further modules for implementing other functionalities, such as functionalities for performing scheduling of radio transmissions or otherwise managing radio transmissions, and that the modules of the access node 500 do not necessarily represent a hardware structure of the access node 500, but may also correspond to functional elements, e.g., implemented by hardware, software, or a combination thereof.

Figure 6:
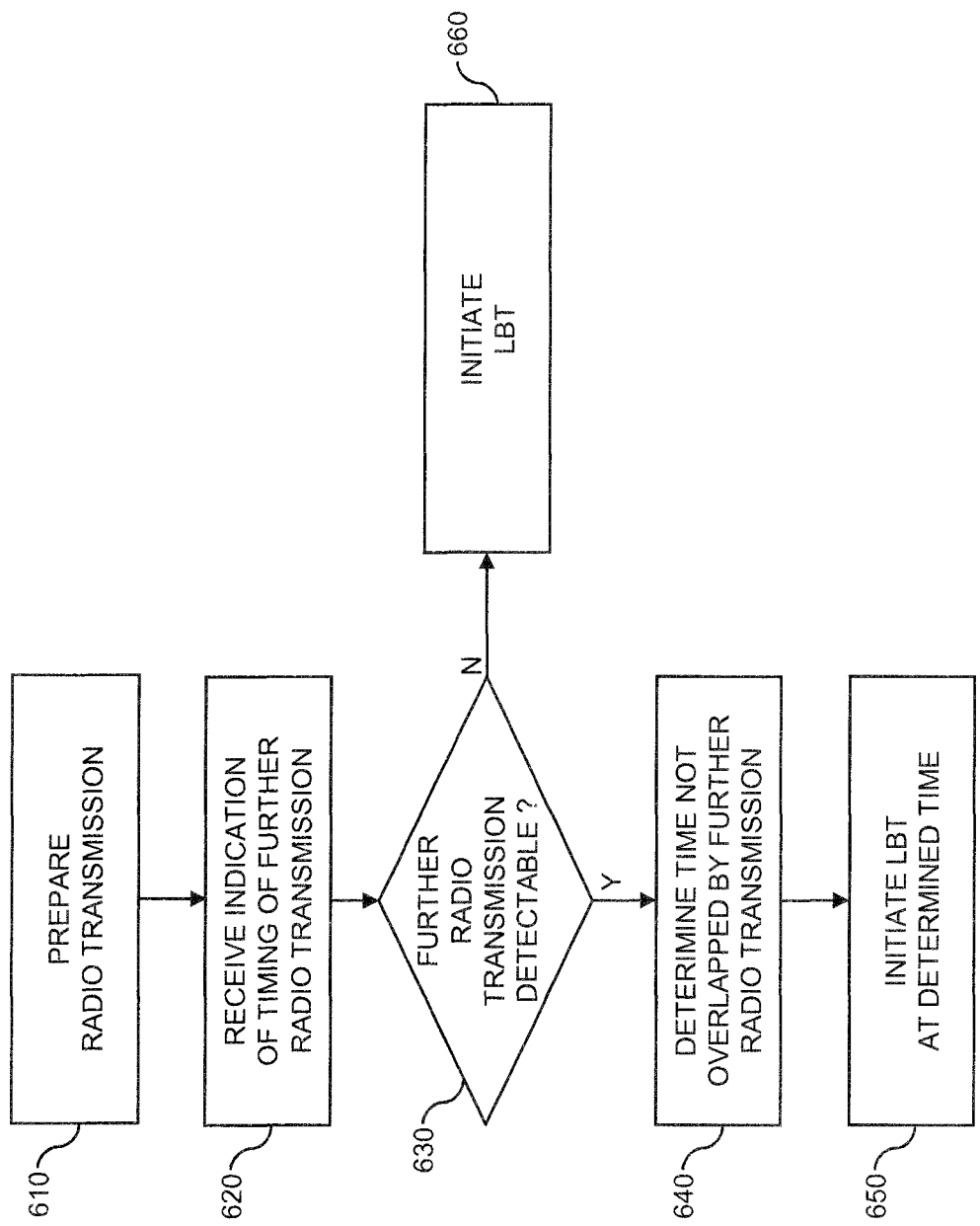
FIG. 6 shows a flowchart for schematically illustrating a further method according to an embodiment of the invention.

FIG. 6 shows a flowchart for illustrating a method of controlling radio transmission in a wireless communication network. The method may be utilized for implementing the illustrated concepts in an access node, e.g., a base station of a cellular radio access technology, such as an eNB of the LTE cellular radio access technology, or an access point of a WLAN technology. The method is assumed to involve using a timing of a radio transmission performed by a further access node for controlling an LBT procedure for a further radio transmission performed by the access node. An example of such further radio transmission is the above-mentioned radio transmission 20A performed by the access node 100-A. The method may for example be performed by the above-mentioned access node 100-A. The further access node may then correspond to the above-mentioned access node 100-B. If a processor-based implementation of the access node is used, the steps of the method may be performed by one or more processors of the access node. In such a case the access node may further comprise a memory in which program code or other information for implementing the below described functionalities is stored.

At optional step 610, the access node may prepare the further radio transmission. An example of such further radio transmission is the radio transmission 20A prepared by the access node 100-A. Such preparation may for example involve scheduling the further radio transmission, e.g., by selecting a set of radio resources to be used for the further radio transmission. Further, this may also involve indicating the selected radio resources to a radio device to or from which the further radio transmission is to be performed. The set of radio resources may be from an unlicensed frequency spectrum, e.g., a frequency spectrum shared with other operators and/or other radio technologies. The unlicensed frequency spectrum may include one or more unlicensed frequency bands, and such multiple unlicensed frequency bands may be adjacent or separated from each other in the frequency domain. The set of radio resources may correspond to a set of radio resources assigned or used for the radio transmission performed by the further access node or may at least partially overlap with the set of radio resources assigned or used for the radio transmission performed by the further access node. Preparation of the further radio transmission may also involve requesting, from the further access node, an indication of the timing of the radio transmission performed by the further access node. Examples of such radio transmission performed by other access nodes are the radio transmissions 20B, 20C performed by the access node 100-B, and an example of such indication is the above-mentioned timing indication transmitted by the access node 100-B. The indication may be requested individually with respect the specific radio transmission performed by the further access node. Further, the access node may request the indication in terms of a subscription, e.g., by indicating that the access node should be provided with the indication for all radio transmissions or a subset of all radio transmissions performed by the further access node, without requiring a request for each individual radio transmission.

At step 620, the access node receives an indication from the further access node of the wireless communication network, e.g., the indication requested at step 610. The indication indicates a timing of the radio transmission performed by further the access node on a set of radio resources. An example of such indication is the above-mentioned timing indication transmitted by the access node 100-B. The radio transmission may include a downlink transmission from the further access node to one or more radio devices and/or an uplink radio transmission from one or more radio devices to the further access node. An example of such radio transmission is the radio transmission 20B or 20C performed by the access node 100-B, and examples of such radio devices are the UEs 10-B, 10-C. The set of radio resources may be from an unlicensed frequency spectrum, e.g., a frequency spectrum shared with other operators and/or other radio technologies. The indication may be transmitted before start of the radio transmission or during the radio transmission performed by the further access node. Examples of how transmission of the indication may be timed are described above in connection with FIGS. 2 and 3.

The indication may indicate whether the radio transmission performed by the further access node comprises a downlink radio transmission from the further access node to at least one radio device, e.g., the UE 10-B, 10-C, and/or an uplink radio transmission from at least one radio device, e.g., the UE 10-B, 10-C, to the further access node. The indication may also identify such radio device. In some scenarios, the radio transmission performed by the further access node may utilize one or more carriers. The indication may then also identify the carrier(s). In some scenarios, the indication may also otherwise identify the set of radio resources or radio resources from the set, e.g., in terms of one or more resource blocks defined in the time-frequency domain. Further, the indication may indicate a traffic type associated with the radio transmission performed by the further access node or a priority of traffic associated with the radio transmission performed by the further access node.

As mentioned above, each of the access node and the further access node may correspond to a base station of a cellular radio access technology, e.g., to an eNB of the LTE cellular radio access technology. If the access node and the further access node each correspond to an eNB, the indication may be transmitted via an X2 interface of the LTE radio access technology.

In other scenarios, one of the access node and the further access node corresponds to a base station of a cellular radio access technology, e.g., to an eNB of the LTE cellular radio access technology, and the other of the access node and the further access node corresponds to an access point of a WLAN technology. If one of the access node and the further access node corresponds to an eNB and the other of the access node and the further access node corresponds to an access point of a WLAN technology, the indication may transmitted via an Xw interface of the LTE radio access technology.

As explained in connection with step 610, in some scenarios the access node may send a request to the further access node, e.g., in terms of a subscription, and receive the indication in response to the request. In such scenarios, the access node may apply various criteria for deciding whether to send the request. For example, the access node may determine whether radio transmissions performed by the further access node, e.g., the radio transmissions 20B, 20C performed by the access node 100-B, are detectable by the access node or by at least one radio device connected to the access node, e.g., by the access node 100-A or the UE 10-A. The access node may then send the request in response to determining that radio transmissions performed by the further access node are detectable by the access node or by at least one radio device connected to the access node. Further, the access node may determine a delay associated with transmission of the indication from the further access node to the access node. The access node may then send the request in response to the delay being below a threshold.

At optional step 630, the access node may determine whether the radio transmission performed by the further access node is detectable by a transmitter of the further radio transmission. In the case of a downlink radio transmission, the transmitter would correspond to the access node itself, while in the case of an uplink radio transmission the transmitter would correspond to a radio device connected to the access node, e.g., to the UE 10-A. In response to determining that the radio transmission performed by the further access node is detectable by the transmitter of the further radio transmission, the access node may proceed to step 640, as indicated by branch "Y". In response to determining that the radio transmission performed by the further access node is not detectable by the transmitter of the further radio transmission, the access node may proceed to step 660, as indicated by branch "N".

At step 640, the access node determines a time which is not overlapped by the radio transmission performed by the further access node. This is accomplished based on the indication received at step 620. The time not overlapped by the radio transmission performed by the further access node can be either before a start time of the radio transmission for after an end time of the radio transmission, e.g., as explained in connection with FIGS. 2 and 3.

For example, in response to the radio transmission performed by the further access node having a lower priority than the further radio transmission performed by the access node, the access node may determine the time as a time before the radio transmission performed by the further access node begins. This may enable the access node to grab the set of radio resources from the further access node. On the other hand, in response to the radio transmission performed by the further access node having a higher priority than the further radio transmission performed by the access node, the access node may determine the time as a time after completion of the radio transmission performed by the further access node. The priority of the radio transmission in relation to the further radio transmission may for example be determined depending on information provided by the indication, e.g., whether the radio transmission includes an uplink radio transmission or a downlink radio transmission, the carrier(s) utilized for the radio transmission, and/or on a traffic type associated with the radio transmission.

At step 650, the access node initiates the LBT procedure at the determined time. The LBT procedure involves detecting whether there is an ongoing radio transmission on the set of radio resources and, in response to detecting that there is no ongoing radio transmission on the set of radio resources, performing the further radio transmission on the set of radio resources. In the case of the further radio transmission including a downlink radio transmission from the access node, the access node itself would perform the LBT procedure. In the case of the further radio transmission including an uplink radio transmission from a radio device, e.g., the UE 10-A, to the access node, the LBT procedure would be performed by this radio device. In the latter case, the access node could control the time at which the LBT procedure is performed by the radio device through a scheduling process, e.g., by assigning a corresponding time slot for performing the further radio device and indicating this timeslot to the radio device.

At step 660, in response to determining that the radio transmission performed by the further access node is not detectable by the transmitter of the further radio transmission, the access node may initiate the LBT procedure at some other time, e.g., during the radio transmission performed by the further access node or at an arbitrary time, such as immediately when preparation of the further radio transmission is finished.

Figure 7:
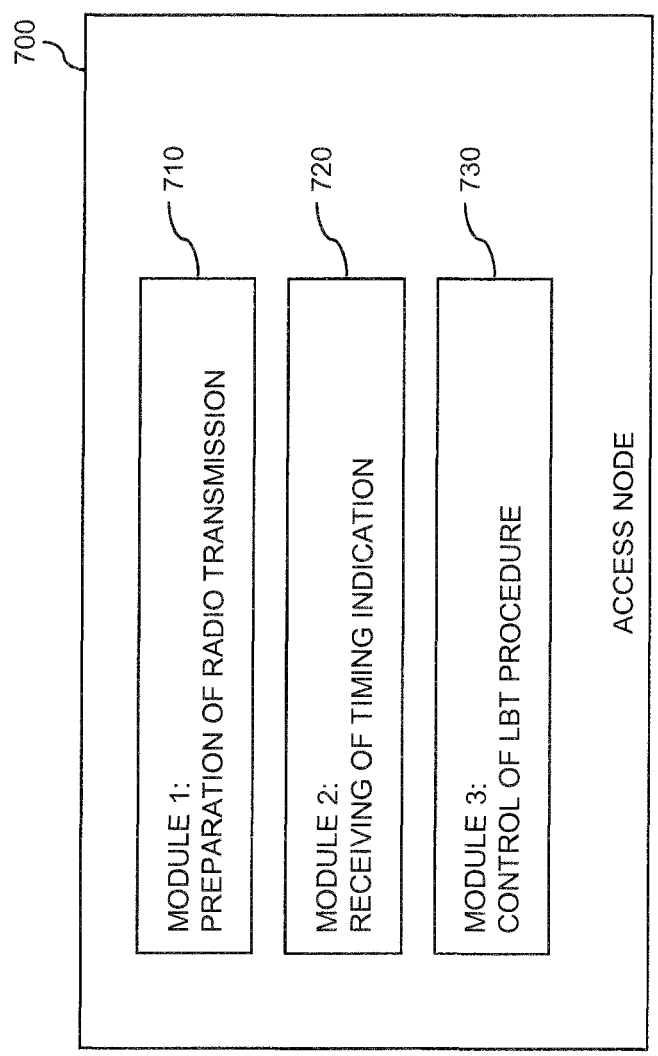
FIG. 7 shows a block diagram for illustrating functionalities of an access node according to an embodiment of the invention.

FIG. 7 shows a block diagram for illustrating functionalities of an access node 700 which operates according to the method of FIG. 6. As illustrated, the access node 700 may be provided with an optional module 710 configured to prepare the further radio transmission, such as explained in connection with step 610. Further, the access node 700 may be provided with a module 720 configured to receive the indication of the timing of the radio transmission from the further access node, such as explained in connection with step 620. Further, the access node 700 may be provided with a module 730 configured to control the LBT procedure associated with the further radio transmission, such as explained in connection with steps 630, 640, 650, and 660.

It should be understood that the access node 700 may also include further modules for implementing other functionalities, such as functionalities for performing scheduling of radio transmissions or otherwise managing radio transmissions, and that the modules of the access node 700 do not necessarily represent a hardware structure of the access node 700, but may also correspond to functional elements, e.g., implemented by hardware, software, or a combination thereof.

The methods of FIG. 4 and FIG. 6 may also be combined in a system which includes a first access node operating according to the method of FIG. 6 and a second access node operating according to the method of FIG. 4. In such a system, the second access node would transmit indication of a timing of a radio transmission performed by the second access node to the first access node. The first access node would then utilize the indicated timing for controlling an LBT procedure for a further radio transmission performed by the first access node.

Figure 8:
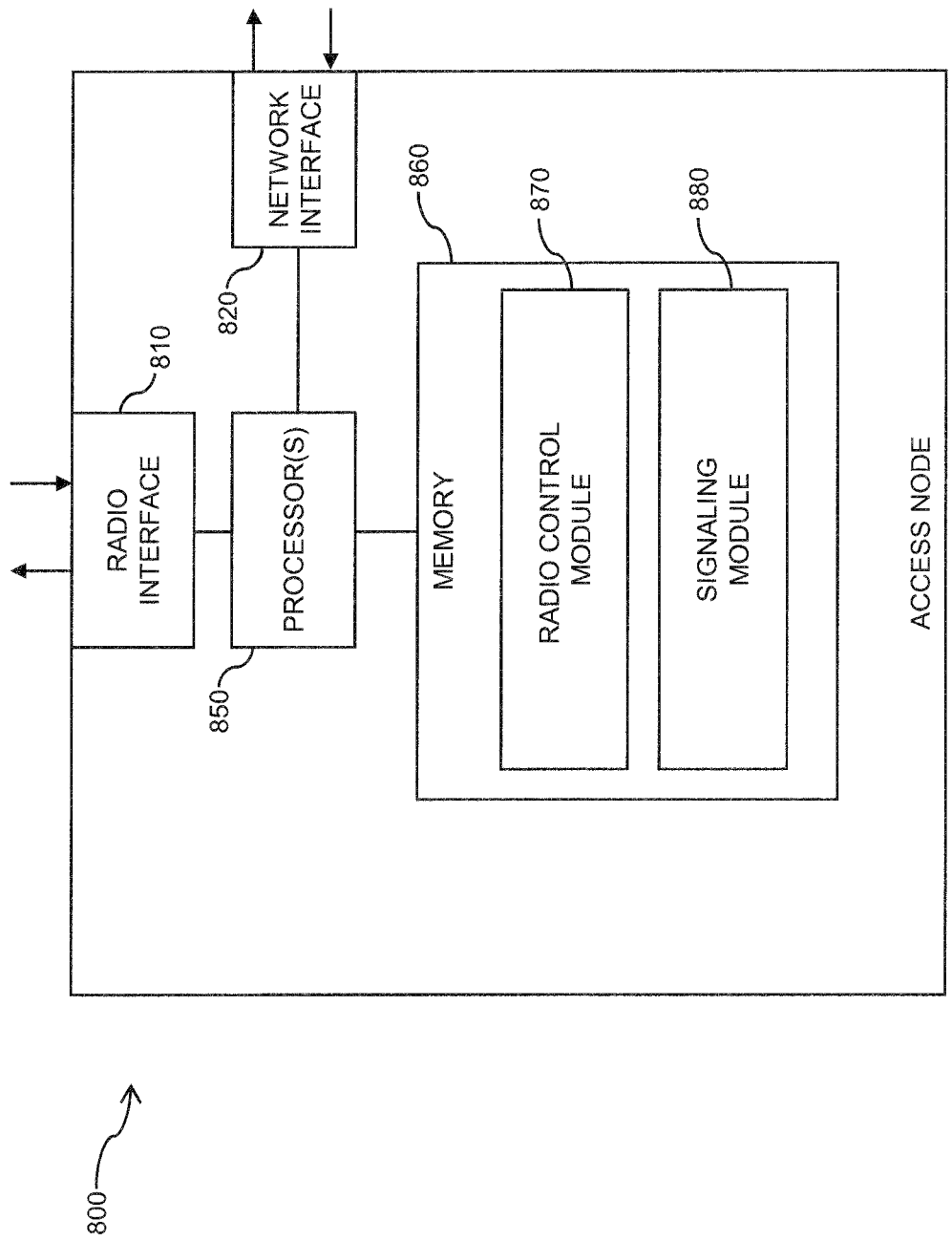
FIG. 8 schematically illustrates exemplary structures of an access node according to an embodiment of the invention.

FIG. 8 illustrates exemplary structures which may be used for implementing the above concepts in an access node 800 of a wireless communication network, such as one of the access nodes 100-A, 100-B. The access node 800 may for example correspond to a base station of a cellular radio access technology, e.g., to an eNB of the LTE cellular radio access technology, or to access point of a WLAN technology.

As illustrated, the access node 800 may include a radio interface 810 for enabling access of one or more radio devices, such as the above-mentioned UEs 10-A, 10-B, 10-C, to the wireless communication network. The radio interface 810 may for example implement the Uu radio interface of the LTE cellular radio access technology. As further illustrated, the access node 800 may include a network interface 820 for connecting the access node to other nodes of the cellular radio network, e.g., to other access nodes. The network interface 920 may for example implement the interface 50 of FIG. 1 and may correspond to the X2 or Xw interface of the LTE cellular radio access technology.

Further, the access node 800 may include one or more processors 950 coupled to the radio interface 810 and network interface 820, and a memory 860 coupled to the processor(s) 850. The memory 860 may include a Read Only Memory (ROM), e.g., a flash ROM, a Random Access Memory (RAM), e.g., a Dynamic RAM (DRAM) or Static RAM (SRAM), a mass storage, e.g., a hard disk or solid state disk, or the like. The memory 860 includes suitably configured program code to be executed by the processor(s) 850 so as to implement the above-described functionalities of an access node. In particular, the memory 860 may include various program code modules for causing the access node 800 to perform processes as described above, e.g., corresponding to the method steps of FIG. 4 and/or of FIG. 6.

As illustrated, the memory 860 may include a radio control module 870 for implementing the above-described functionalities related to performing radio transmissions, specifically controlling an LBT procedure for a radio transmission, such as described in connection with steps 440 and 450 of FIG. 4 and/or in connection with steps 640, 650, and 660 FIG. 6. Further, the memory 860 may include a signaling module 880 for implementing the above-described functionalities of sending and/or receiving the indication of timing of a radio transmission, such as explained in connection with step 430 of FIG. 4 and/or in connection with step 620 of FIG. 6.

It is to be understood that the structures as illustrated in FIG. 8 are merely schematic and that the access node 800 may actually include further components which, for the sake of clarity, have not been illustrated, e.g., further interfaces or processors. Also, it is to be understood that the memory 860 may include further types of program code modules, which have not been illustrated, e.g., program code modules for implementing known functionalities of an eNB, WLAN access point, or similar access node. According to some embodiments, also a computer program may be provided for implementing functionalities of the access node 800, e.g., in the form of a physical medium storing the program code and/or other data to be stored in the memory 860 or by making the program code available for download or by streaming.

As can be seen, the concepts as described above may be used for efficiently controlling LBT procedures. Specifically, by means of the timing indication, the chances of success of an LBT procedure may be increased as compared to situations in which the LBT procedure is performed at an arbitrary time. As a consequence, undesired delays of radio transmissions can be avoided.

It is to be understood that the examples and embodiments as explained above are merely illustrative and susceptible to various modifications. For example, the illustrated concepts may be applied in connection with various cellular radio network technologies. Further, the timing indication could be supplemented with various kinds of other information.

Moreover, it is to be understood that the above concepts may be implemented by using correspondingly designed software to be executed by one or more processors of an existing device, or by using dedicated device hardware. Further, it should be noted that the illustrated radio device may be implemented as a single device or as a system of multiple interacting devices.

The invention claimed is:

1. A method of controlling radio transmission in a wireless communication network, the method comprising:
an access node of the wireless communication network receiving an indication from a further access node of the wireless communication network, the indication indicating a start time, an end time and remaining duration from a current time of a radio transmission performed by the further access node on a set of radio resources,
wherein the indication further indicates a traffic type associated with the radio transmission and a priority of traffic associated with the radio transmission;
the access node determining, based on the indication, a time which is not overlapped by the radio transmission performed by the further access node; and
the access node initiating a listen-before-talk procedure at the determined time, the listen-before-talk procedure comprising detecting whether there is an ongoing radio transmission on the set of radio resources and, in response to detecting that there is no ongoing radio transmission on the set of radio resources, performing a further radio transmission on the set of radio resources.

2. The method of claim 1, further comprising:
the access node determining whether the radio transmission performed by the further access node is detectable by a transmitter of the further radio transmission; and
in response to determining that the radio transmission performed by the further access node is detectable by the transmitter of the further radio transmission, the access node initiating the listen-before-talk procedure at the determined time.

3. The method of claim 2, further comprising the access node initiating, in response to determining that the radio transmission performed by the further access node is not detectable by the transmitter of the further radio transmission, the listen-before-talk procedure during the radio transmission performed by the further access node.

4. The method of claim 1, wherein the indication indicates whether the radio transmission performed by the further access node comprises a downlink radio transmission from the further access node to at least one radio device and/or an uplink radio transmission from at least one radio device to the further access node.

5. The method of claim 1:
wherein the radio transmission performed by the further access node utilizes one or more carriers, and
wherein the indication identifies the one or more carriers.

6. A method of controlling radio transmission in a wireless communication network, the method comprising:
an access node of the wireless communication network sending an indication to a further access node of the wireless communication network, the indication indicating a start time, an end time and remaining duration from a current time of a radio transmission performed by the access node on a set of radio resources,
wherein the indication further indicates a traffic type associated with the radio transmission and a priority of traffic associated with the radio transmission; and
the access node initiating a listen-before-talk procedure, the listen-before-talk procedure comprising detecting whether there is an ongoing radio transmission on the set of radio resources and, in response to detecting that there is no ongoing radio transmission on the set of radio resources, performing the radio transmission on the set of radio resources.

7. The method of claim 6, further comprising:
the access node determining whether the radio transmission performed by the access node is detectable by the further access node or at least one radio device connected to the further access node; and
in response to determining that the radio transmission performed by the access node is detectable by the further access node or at least one radio device connected to the further access node, the access node sending the indication to the further access node.

8. The method of claim 6, comprising:
the access node determining a delay associated with transmission of the indication from the access node to the further access node; and
the access node sending the indication in response to the delay being below a threshold.

9. The method of claim 6, wherein indication indicates whether the radio transmission performed by the access node comprises a downlink radio transmission from the access node to at least one radio device and/or an uplink radio transmission from at least one radio device to the access node.

10. The method of claim 6:
wherein the radio transmission performed by the access node utilizes one or more carriers, and
wherein the indication identifies the one or more carriers.

11. An access node for a wireless communication network, the access node comprising:
processing circuitry;
memory containing instructions executable by the processing circuitry whereby the access node is operative to:
receive an indication from a further access node of the wireless communication network, the indication indicating a start time, an end time and remaining duration from a current time of a radio transmission performed by the further access node on a set of radio resources,
wherein the indication further indicates a traffic type associated with the radio transmission and a priority of traffic associated with the radio transmission;
determine, based on the indication, a time which is not overlapped by the radio transmission performed by the further access node; and
initiate a listen-before-talk procedure at the determined time, the listen-before-talk procedure comprising detecting whether there is an ongoing radio transmission on the set of radio resources and, in response to detecting that there is no ongoing radio transmission on the set of radio resources, performing a further radio transmission on the set of radio resources.

12. The access node of claim 11, wherein the instructions are such that the access node is operative to:
determine whether the radio transmission performed by the further access node is detectable by a transmitter of the further radio transmission; and
in response to determining that the radio transmission performed by the further access node is detectable by a transmitter of the further radio transmission, initiate the listen-before-talk procedure at the determined time.

13. The access node of claim 12, wherein the instructions are such that the access node is operative to initiate, in response to determining that the radio transmission performed by the further access node is not detectable by a transmitter of the further radio transmission, the listen-before-talk procedure during the radio transmission performed by the further access node.

14. The access node of claim 11, wherein the indication indicates whether the radio transmission performed by the further access node comprises a downlink radio transmission from the further access node to at least one radio device and/or an uplink radio transmission from at least one radio device to the further access node.

15. The access node of claim 11:
wherein the radio transmission performed by the further access node utilizes one or more carriers, and
wherein the indication identifies the one or more carriers.

16. An access node for a wireless communication network, the access node comprising:
processing circuitry;
memory containing instructions executable by the processing circuitry whereby the access node is operative to:
send an indication to a further access node of the wireless communication network, the indication indicating a start time, an end time and remaining duration from a current time of a radio transmission performed by the access node on a set of radio resources,
wherein the indication further indicates a traffic type associated with the radio transmission and a priority of traffic associated with the radio transmission; and
initiate a listen-before-talk procedure, the listen-before-talk procedure comprising detecting whether there is an ongoing radio transmission on the set of radio resources and, in response to detecting that there is no ongoing radio transmission on the set of radio resources, performing the radio transmission on the set of radio resources.

17. The access node of claim 16, wherein the instructions are such that the access node is operative to:
determine whether the radio transmission performed by the access node is detectable by the further access node or at least one radio device connected to the further access node; and
in response to determining that the radio transmission performed by the access node is detectable by the further access node or at least one radio device connected to the further access node, send the indication to the further access node.

18. The access node of claim 16, wherein the instructions are such that the access node is operative to:
determine a delay associated with transmission of the indication from the access node to the further access node; and
send the indication in response to the delay being below a threshold.

19. The access node of claim 16, wherein indication indicates whether the radio transmission performed by the access node comprises a downlink radio transmission from the access node to at least one radio device and/or an uplink radio transmission from at least one radio device to the access node.

20. The access node of claim 16:
wherein the radio transmission performed by the access node utilizes one or more carriers, and
wherein the indication identifies the one or more carriers.

* * * * *